E. C. HORST.
ARM AND CLUSTER PICKER.
APPLICATION FILED JUNE 25, 1912.
1,054,122.
Patented Feb. 25, 1913.
2 SHEETS—SHEET 1.
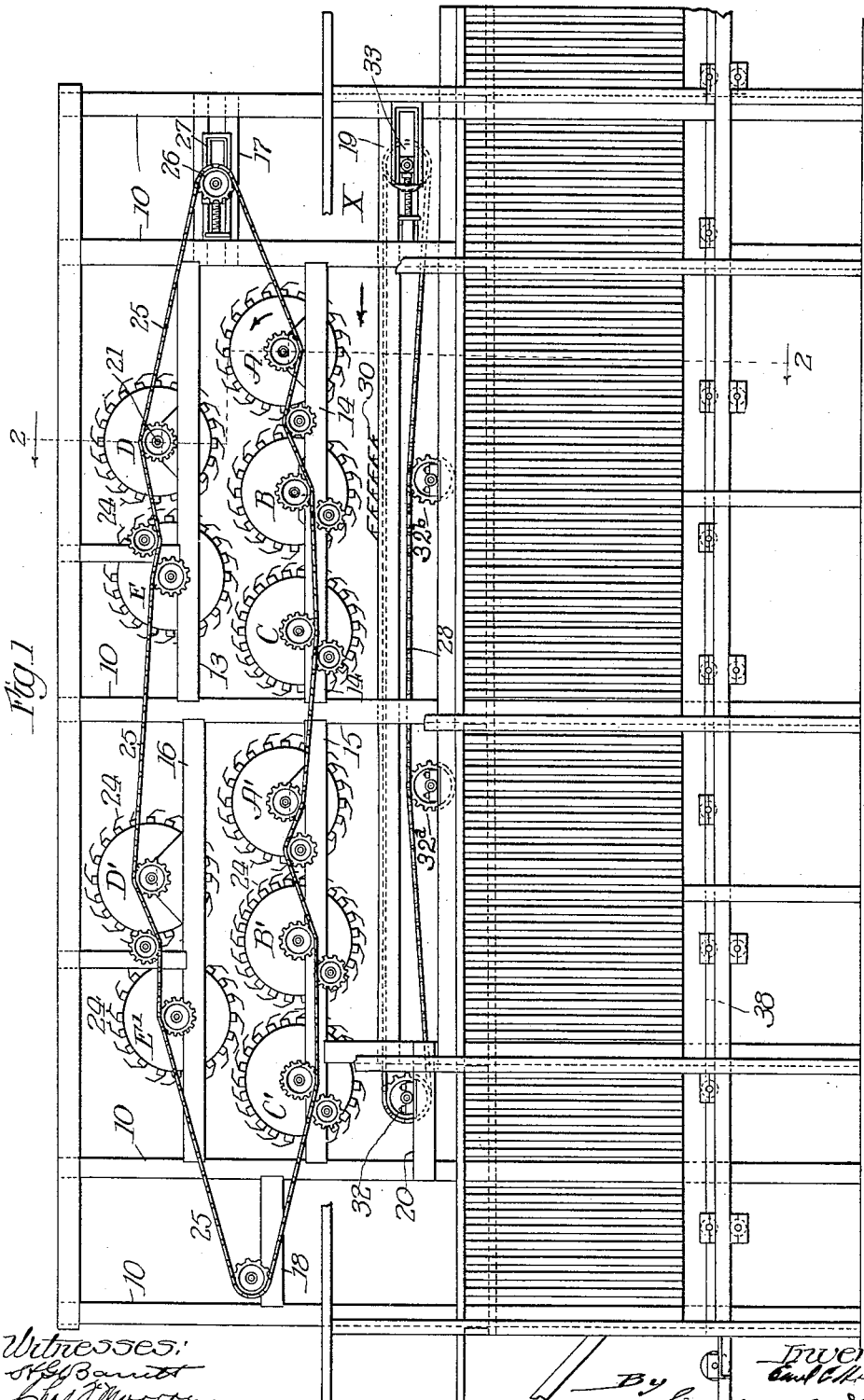

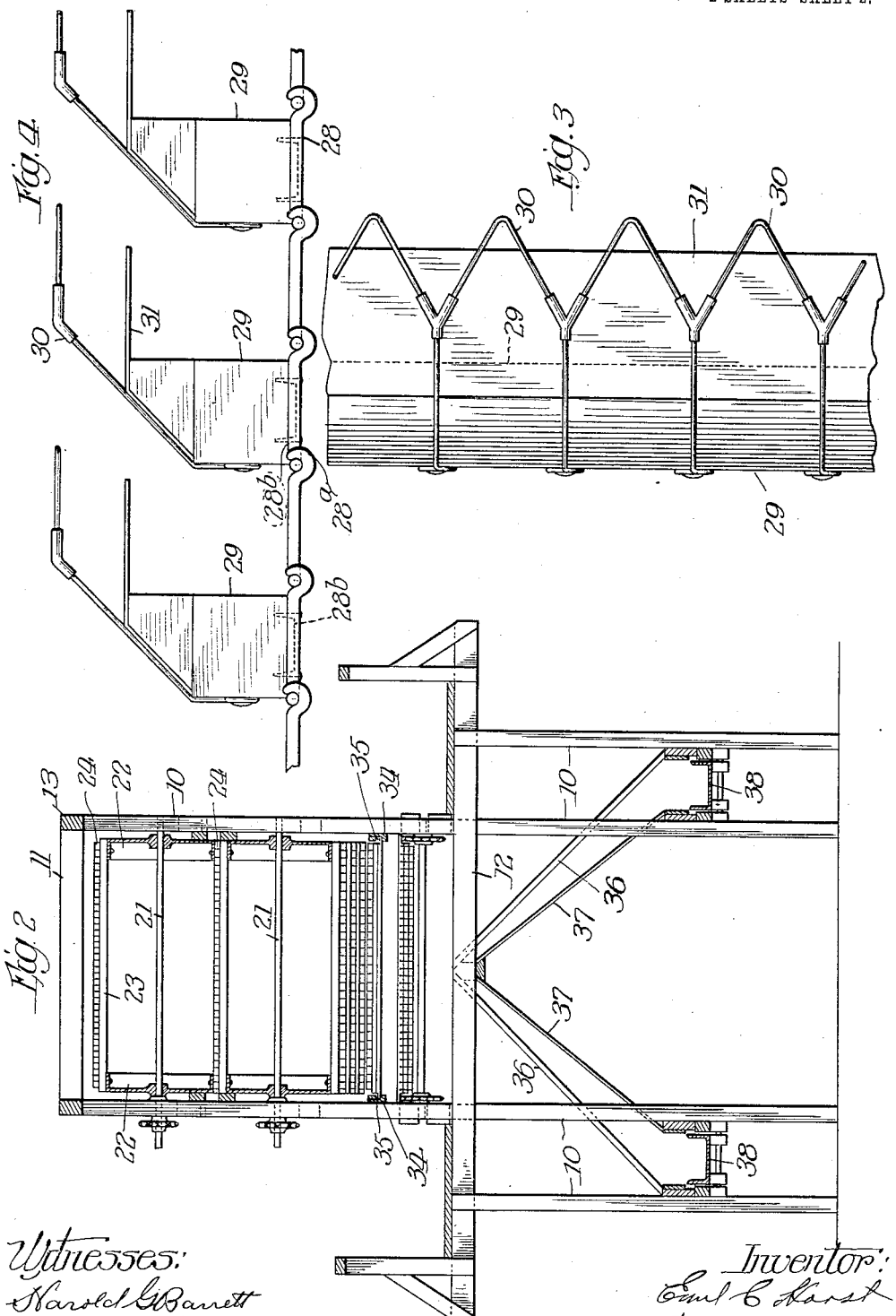

UNITED STATES PATENT OFFICE.

EMIL CLEMENS HORST, OF SAN FRANCISCO, CALIFORNIA, ASSIGNOR TO E. CLEMENS HORST COMPANY, OF SAN FRANCISCO, CALIFORNIA, A CORPORATION OF NEW JERSEY.

ARM AND CLUSTER PICKER.

1,054,122.  Specification of Letters Patent.  Patented Feb. 25, 1913.

Application filed June 25, 1912. Serial No. 705,771.

*To all whom it may concern:*

Be it known that I, EMIL CLEMENS HORST, a citizen of the United States, residing at San Francisco, in the county of San Francisco, in the State of California, have invented certain new and useful Improvements in Arm and Cluster Pickers, of which the following is a specification.

My invention relates to machines for mechanically picking hops and has particular reference to a picker adapted for the separation of the hops from the arms or clusters which have become broken from the vines.

The construction of the present invention is particularly adapted for use with very heavy growths of hops and may be found unnecessary where the growth is light and the vines easily handled.

In the machine picking of hops there is always a certain amount of wagon breakage. Arms of vines and clusters of hops are broken from the main vine either in pulling vines down from the trellis wires to which they are fastened overhead in the fields, or else broken in loading or unloading from the wagons at the machines, prior to being fed thereinto.

My invention will be more readily understood by reference to the accompanying drawings, wherein, Figure 1 is a side elevation of a machine constructed in accordance with my invention; Fig. 2 is an irregular section on the line 2—2 of Fig. 1; Fig. 3 is a plan view of the fingers forming part of the moving floor, and Fig. 4 is an end elevation of the parts shown in Fig. 3.

Referring more particularly to the drawings, it will be seen that my novel picker is mounted within a frame work comprising uprights 10 and transverse girders 11, 12. Intermediate, longitudinally extending members 13, 14, 15, 16, are provided, these members being adapted to carry the bearings for the picker drums. Other longitudinally extending members 17, 18, are provided to carry bearings for sprocket wheels later to be described. Similar members 19, 20, carry the bearings for the sprocket wheels over which the picker floor is operated. The transverse members 12 are extended beyond the machine on each side and provide a platform or runway having suitable guard rails.

Carried in suitable bearings on the members 13, 14, 15, 16, is a plurality of picker drums very similar in construction to those disclosed in my copending application, Serial No. 563,420, filed May 25, 1910. The arrangement of the drums in this instance is very different from that of the application referred to. In the present instance I prefer to employ two sets of picker drums having five drums in each set and it is the peculiar arrangement of these drums to which I attribute the success in operation. The drums are formed of shafts 21, having end portions or heads 22, keyed to the shaft and provided with a plurality of bars 23, arranged around the periphery of the heads. These bars 23 are provided with a plurality of bent wire picker fingers 24, such as shown in the copending application heretofore referred to. For the sake of clearness and facility in the description I have lettered the drums in the different sets A, B, C, D, E, and A′, B′, C′, D′, E′. Preferably I provide forty bars around the periphery of the drums C, C′, B′, and twenty bars on the remainder of the drums. The reason for this will be apparent inasmuch as these drums are the last in each series and any hops which have not been picked theretofore will be compelled to pass a larger number of picker fingers. In this way I make certain that no hops shall remain unseparated from the stems or clusters. It will be noted that all of the five drums in each set are in contact at their peripheries with one of the adjoining drums. They are rotated by means of a chain 25, this chain passing over sprockets on the ends of the different drums and being tightened by suitable idlers as shown. Chain adjusting means, such as the sprocket 26, mounted in the slotted bearing 27 are provided.

Below the drums I prefer to mount what is in effect a moving floor or picker fingers, that is, I provide a chain 28, having mounted thereon cross bars 29, these cross bars carrying picker fingers 30 and an underlying plate of sheet metal 31. This moving floor passes over sprockets 32, 33, at either end of the machine, the latter sprocket being preferably adjustable. In order that the moving floor may always occupy its proper plane, the chains on either side run in grooves 35, provided in the members 34. Although I have shown the chain as carrying cross bars only for a small portion of its length, it will be understood that these cross bars are provided over the entire length of the endless chain. In order to provide the necessary flexibility, I prefer to connect cross bars to each alternate link of the chain, as shown in Fig. 4. The cross bars may be connected to the links of the chain in any suitable manner, preferably a special link such as shown at 28ª being rigidly secured to the cross bars by means of a fastener such as shown at 28ᵇ. The underlying strip of sheet metal is adapted to prevent clusters of hops falling through the picking floor before the hops are separated from the stems by the action of the picking drums set above the picking floor. This moving floor of fingers travels in the direction of the arrow in Fig. 1, that is, with the open end of the fingers foremost and at the rate approximately of 100 to 150 feet per minute.

Referring now to Fig. 2, it will be seen that I provide a form of screen composed of angle bars 36, set at substantially an angle of 45° and extending from the longitudinal center line of the machine to a point outside thereof. In this way, as will be seen by reference to Fig. 2, a construction is provided which is in effect a screen, that is, the spaces are large enough for hops to fall between but not large enough for leaves or stems to pass therethrough. Mounted below the angles 36 and at a more acute angle, is an imperforate metal deflector 37, treminating just above conveyers 38, extending to a point where the hops may be further treated or conveyed to the dry house as desired. Preferably, the hops are delivered by the conveyers 38 to a cross conveyer leading to a separating cylinder not shown herein.

Referring now to the operation of the machine and the action of the different parts in the work of separating the hops from the clusters or stems, it will be understood that the hops to be picked in this machine are those which have been broken from the vines in handling and are in the nature of clusters or stems having clusters or individual hops attached thereto. These are carried to the machine and dumped onto the moving finger floor at the point X. Many of these stems and hops depend through the fingers 30 and rest upon galvanized iron strips 31. The larger arms or stems so fed upon the finger floor, because of their size, extend considerably above the same, and will be caught by the fingers of the revolving drum A, which is moving, as shown by the arrow in Fig. 1, at a tangent and in an opposite direction to the movement of the finger floor. The resultant action will be the picking of all hops which depend through the fingers of the traveling floor, whereupon the freed stem will be lifted up by the fingers of drum A and drawn into the space between drums A and D and then picked up by the fingers of drum B. The fingers of these drums remove so many hops that the stem will be drawn by drum B to drum C and, by concerted action of all the fingers, all hops and leaves are picked off the stem and in case the hops should be divided into clusters these are separated by the action of the diamond shaped space formed by the fingers of the drums as they revolve tangent to one another or tangent to the traveling finger floor. Where very large stems or arms are placed into the machine, some may be drawn by drum D instead of entering the space between drums A and D and such arms then travel over the top of the drums D and E to be discharged upon traveling finger floor just beyond drum C. The stem will then be passed through the second set of picker drums and any remaining hops removed therefrom. Returning to the action of the first set of drums, the fingers of drum B pick smaller arms or stems that were not large enough to be caught by drum A, and the fingers of drum C then sever any clusters of hops that are depending through the finger floor. The action of the second set of five drums is identical to that of the first set. However, by reason of their position, they are only called upon to pick the hops from such stems as are carried over by the drums D and E of the first set. As already stated, the hops picked by the action of the traveling finger floor and revolving finger drums are carried by the strips of sheet metal 31 and the greater portion thereof are discharged when the traveling cross bars pass around sprocket 32, to be returned under the machine. However, the idler sprockets 32ª, 32ᵇ, on which the finger floor returns, tend to change the angle of travel of the floor somewhat and any hops not theretofore discharged will fall at this point. The picked arms or stems and leaves for the greater part remain on top of the traveling finger floor and are discharged over the sprocket 32, but a portion of these also are carried along and fall at various points of travel below the finger floor and on being released the hops, arms, stems and leaves all fall upon the angle iron grates 36, and, as before described, the hops fall through onto the sheet metal deflectors and into conveyers 38, while the picked arms and many of the stems and leaves slide on down the angle iron grate to be removed as rubbish.

It will be understood that I have shown herein what I consider to be the preferred embodiment of my invention. It will be understood, however, that modifications may be made therein without departing from the spirit of my invention.

I claim:

1. A machine for picking hops, comprising a moving floor carrying a plurality of superposed picker fingers, and a plurality of drums mounted above said moving floor, said drums being provided with a plurality of picker fingers on their peripheries and being adapted for rotation tangent and in a direction opposite to that of the moving floor, substantially as described.

2. A machine for picking hops, comprising a traveling floor having a series of picker fingers superposed thereabove and traveling therewith, a plurality of drums mounted tangent and for rotation in an opposite direction to the travel of the finger floor, said drums carrying a plurality of picker fingers, and means below the machine for separating the picked hops from the leaves, substantially as described.

3. A machine for picking hops, comprising a moving floor carrying a plurality of superposed picker fingers, and a plurality of drums mounted above said moving floor, said drums being provided with a plurality of picker fingers on their peripheries and being adapted for rotation tangent and in a direction opposite to that of the moving floor, each of the drums being so mounted that its periphery is substantially in contact with the periphery of another drum, substantially as described.

4. A machine for picking hops, comprising a moving floor carrying a plurality of superposed picker fingers, a plurality of drums mounted above said moving floor, said drums being provided with a plurality of picker fingers on their peripheries and being adapted for rotation tangent and in a direction opposite to that of the moving floor, each of the drums being so mounted that its periphery is substantially in contact with the periphery of another drum, and means below the machine whereby the picked hops are separated from the leaves and stems, substantially as described.

5. A machine for picking hops, comprising, in combination, a moving floor having a plurality of rows of picker fingers superposed thereabove, a hop supporting shelf provided below each row of picking fingers on the said moving floor, and a plurality of drums mounted above said moving floor, said drums having series of picker fingers on their peripheries, and said drums being adapted for rotation tangent and in a direction of rotation opposite to the travel of the moving floor, substantially as described.

6. A moving floor for hop pickers, comprising an endless chain carrying a plurality of picker-finger-carrying members, picker fingers mounted on said carrying members, and a shelf provided below each set of picker fingers whereby picked hops are supported during a certain portion of the travel of said moving floor, substantially as described.

7. A machine for picking hops, comprising, in combination, a moving floor having a plurality of picker fingers superposed thereabove, two sets of similarly mounted picker drums provided above said moving floor, said picker drums being provided with picker fingers on their peripheries, said drums being adapted for rotation in a direction opposite to that of the moving floor, certain of said drums having a larger number of picker fingers than the remaining drums, substantially as described.

8. A machine for picking hops, comprising, in combination, a moving floor having series of picker fingers superposed thereabove, a plurality of drums mounted above said moving floor and having rows of picker fingers on their peripheries, certain of said drums being farther removed from the line of travel of said pickers on the moving floor than the remainder of the drums in said series, substantially as described.

EMIL CLEMENS HORST.

Witnesses:
CALVIN T. MILANS,
HERBERT S. SHEPARD.

---

Copies of this patent may be obtained for five cents each, by addressing the "Commissioner of Patents, Washington, D. C."